(12) United States Patent
Izawa et al.

(10) Patent No.: US 7,054,730 B2
(45) Date of Patent: May 30, 2006

(54) IRRADIATING DIRECTION CONTROL APPARATUS OF LIGHTING UNIT FOR VEHICLE

(75) Inventors: Makoto Izawa, Shizuoka (JP); Kazuo Goto, Shizuoka (JP); Kazuhiro Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/728,282

(22) Filed: Dec. 4, 2003

(65) Prior Publication Data

US 2004/0138798 A1    Jul. 15, 2004

(30) Foreign Application Priority Data

Dec. 6, 2002    (JP)    ............. P.2002-354913

(51) Int. Cl.
*B60Q 1/115*    (2006.01)

(52) U.S. Cl. .................. 701/49; 362/464; 362/466; 315/82

(58) Field of Classification Search ............... 362/459, 362/460, 463, 465, 466, 469; 315/82; 701/49
See application file for complete search history.

(56) References Cited

U.S. PATENT DOCUMENTS

| | | | | | |
|---|---|---|---|---|---|
| 4,647,069 | A | * | 3/1987 | Iijima | 280/5.514 |
| 5,461,564 | A | * | 10/1995 | Collins et al. | 701/37 |
| 5,465,209 | A | * | 11/1995 | Sammut et al. | 701/37 |
| 5,877,680 | A | * | 3/1999 | Okuchi et al. | 340/468 |
| 5,907,196 | A | * | 5/1999 | Hayami et al. | 307/10.8 |
| 5,962,980 | A | * | 10/1999 | Kluge et al. | 315/82 |
| 6,193,398 | B1 | * | 2/2001 | Okuchi et al. | 362/466 |
| 6,229,263 | B1 | * | 5/2001 | Izawa | 315/80 |
| 6,234,654 | B1 | * | 5/2001 | Okuchi et al. | 362/466 |
| 6,357,898 | B1 | * | 3/2002 | Toda et al. | 362/466 |
| 6,663,268 | B1 | * | 12/2003 | Toda et al. | 362/464 |
| 2002/0045978 | A1 | * | 4/2002 | Nishimura et al. | 701/49 |

FOREIGN PATENT DOCUMENTS

| | | |
|---|---|---|
| JP | 10-226271 | 8/1998 |
| JP | 10-230777 | 9/1998 |
| JP | 2001-080409 | 3/2001 |

* cited by examiner

*Primary Examiner*—Thomas G. Black
*Assistant Examiner*—Eric M. Gibson
(74) *Attorney, Agent, or Firm*—Fish & Richardson P.C.

(57) ABSTRACT

An irradiating direction control apparatus includes an identifier for determining a difference in a load state of the vehicle corresponding to a passenger or carrying capacity. In an initialization performed to eliminate influence of an installation error of a vehicle height detector, a storage device stores data indicative of the installation error, based on a difference between a reference vehicle height corresponding to a load state of the vehicle determined by the identifier, and an actual vehicle height. Then, an irradiation controller obtains the attitude of the vehicle from vehicle height data corrected by using data stored in the storage device for vehicle height detection data, and controls a direction of an optical axis of irradiation of a lighting unit. The reference vehicle height value is changed corresponding to the vehicle load state in initialization, thereby reducing a control error related to the correction of the optical axis of irradiation.

11 Claims, 7 Drawing Sheets

IRRADIATING DIRECTION CONTROL APPARATUS OF LIGHTING UNIT FOR VEHICLE

BACKGROUND OF THE INVENTION

This application claims benefit and priority from the following application: Japanese Patent Application No. JP 2002-354913, filed Dec. 6, 2002, the contents of which is incorporated herein by reference.

1. Technical Field

The present invention relates to a method and system for distinguishing various load conditions and recording and correcting data related to an installation error, such that initialization processing to eliminate the influence on irradiation control caused by the installation error of vehicle height detecting means can be accurately carried out in an irradiating direction control apparatus of a lighting unit for a vehicle.

2. Related Art

In a related art apparatus for correcting and controlling the irradiating direction of a headlamp for a vehicle corresponding to a change in the attitude of the vehicle, there is a related art apparatus for automatically adjusting the irradiating direction of a headlamp to maintain the irradiating direction in a predetermined state when the inclination of a vehicle body is changed (i.e., an auto-leveling apparatus).

In a related art application to a headlamp system having a large light quantity and using a discharge lamp as a light source, glare in the direction of oncoming traffic can be prevented, thereby enhancing safety.

The following related art configurations are known structures of the apparatus.

(1) A related art configuration in which the attitude of a vehicle is recognized by a vehicle height detecting means (a vehicle height sensor) attached to front and rear parts of the vehicle. The control amount of the optical axis of irradiation of a lighting unit based on a change from a reference attitude (a variation in a pitch angle) is calculated to drive an optical component (a reflecting mirror), thereby stably maintaining an irradiating direction.

(2) A related art configuration in which the vehicle height value of one of the axle portions of the front and rear wheels of a vehicle is estimated and predicted from information detected by a vehicle height detecting means (a vehicle height sensor) provided in the other axle portion. A pitch angle is obtained to calculate the control amount of the optical axis of irradiation of a lighting unit based on a variation thereof, thereby driving an optical component (a reflecting mirror) to stably maintain an irradiating direction.

In configuration (2), only one vehicle height detecting means is used. For this reason, the configuration (2) is advantageous in terms of cost and required installation space for the vehicle height detecting means.

However, the related art has various problems and disadvantages. For example, but not by way of limitation, it is necessary to employ a technique for guessing a change in the pitch angle of a vehicle more accurately. For example, but not by way of limitation, in a related art method the number of passengers of the front seat of the vehicle is determined by using a detection signal sent from a seating sensor of a passenger seat and carrying out suitable control for a load state. Additional discussion of this related art is disclosed in published Japanese patent application nos. JP-A-10-226271, JP-A-10-230777, and JP-A-2001-80409, the contents of which are incorporated herein by reference.

In each configuration, when the vehicle height sensor is used, precision in control is adversely affected if variation is caused in an installation state. For example, but not by way of limitation, an initializing switch records an installation error based on a design value in the storage means (memory) of an apparatus by operating or setting the switch. In actual control, it is possible to eliminate the influence of the installation error of the vehicle height sensor by calculating the attitude of the vehicle through an operation from vehicle height data corrected by using data stored in the storage means for vehicle height detection data.

However, the foregoing related art has various problems and disadvantages. For example, but not by way of limitation, there is a problem in that the initialization processing is not always carried out under the condition that the load state of a vehicle is usually set to be constant.

For example, but not by way of limitation, the initialization processing is carried out in a state of 10 L (liter) of gasoline without a passenger, in the assembly line of an automobile manufacturer. On the other hand, when a dealer carries out the initialization processing in a market, the residual amount of the gasoline is not constant, even if there is no passenger. In other words, the initialization processing is carried out within a wide range, from a small amount less than 10 L to a full state.

When the initialization processing is carried out and the load condition of the vehicle is not constant, the precision is not guaranteed. For example, but not by way of limitation, the optical axis of a lighting unit is corrected in an erroneous direction when a control error is great. As a result, glare is caused.

SUMMARY OF THE INVENTION

It is an object of the present invention to overcome at least the problems and disadvantages of the related art. However, the present invention need not overcome the problems and disadvantages of the related art, and further, may not overcome any problems or disadvantages.

It is a further object to fully guarantee an initialization processing also in the case in which the load condition of a vehicle is varied and to reduce the influence of the installation error of vehicle height detecting means on the control of an irradiating direction in the control of the irradiating direction of a lighting unit for the vehicle.

It is also an object of the invention to fully guarantee an initialization processing also when the load condition of a vehicle is varied, and to reduce the influence of the installation error of vehicle height detecting means on the control of an irradiating direction in the irradiating direction control apparatus of a lighting unit for the vehicle.

The invention provides an irradiating direction control apparatus of a lighting unit for a vehicle which carries out an operation for an attitude of the vehicle based on information detected by vehicle height detecting means, thereby changing an irradiating direction of the lighting unit depending on the attitude of the vehicle, the apparatus comprising the following structure.

Identifying means for distinguishing or discriminating a difference in a load state of the vehicle corresponding to a passenger or a carrying capacity.

Storage means for storing data indicative of an installation error of the vehicle height detecting means from a difference between a reference vehicle height value corresponding to a load state of the vehicle distinguished or discriminated by the identifying means and an actual vehicle height value by using the reference vehicle height value in an initialization processing to be carried out for eliminating an influence of the installation error to a vehicle body of the vehicle height detecting means on control.

Irradiation control means for obtaining the attitude of the vehicle by an operation from vehicle height data corrected by using the data stored in the storage means for the data detected by the vehicle height detecting means and controlling a direction of an optical axis of irradiation of the lighting unit for the vehicle based on a result of the operation.

According to the present invention, the reference vehicle height value changes depending on the load state of the vehicle, which is distinguished or discriminated by the identifying means. Consequently, it is possible to reduce a control error, which is caused by a difference in the conditions of the initialization processing.

BRIEF DESCRIPTION OF THE DRAWINGS

The above and other objects and advantages of the present invention will become more apparent by describing in detail exemplary, non-limiting embodiments thereof with reference to the accompanying drawings, wherein like reference numerals designate like or corresponding parts throughout the several views, and wherein.

DETAILED DESCRIPTION OF THE INVENTION

The invention relates to a leveling apparatus (a so-called auto-leveling apparatus) comprising vehicle height detecting means for detecting a change in the height of the axle portion of a front wheel or a rear wheel, and controlling an irradiating direction following a change in the attitude of the vehicle during stop or running.

Figure 1:
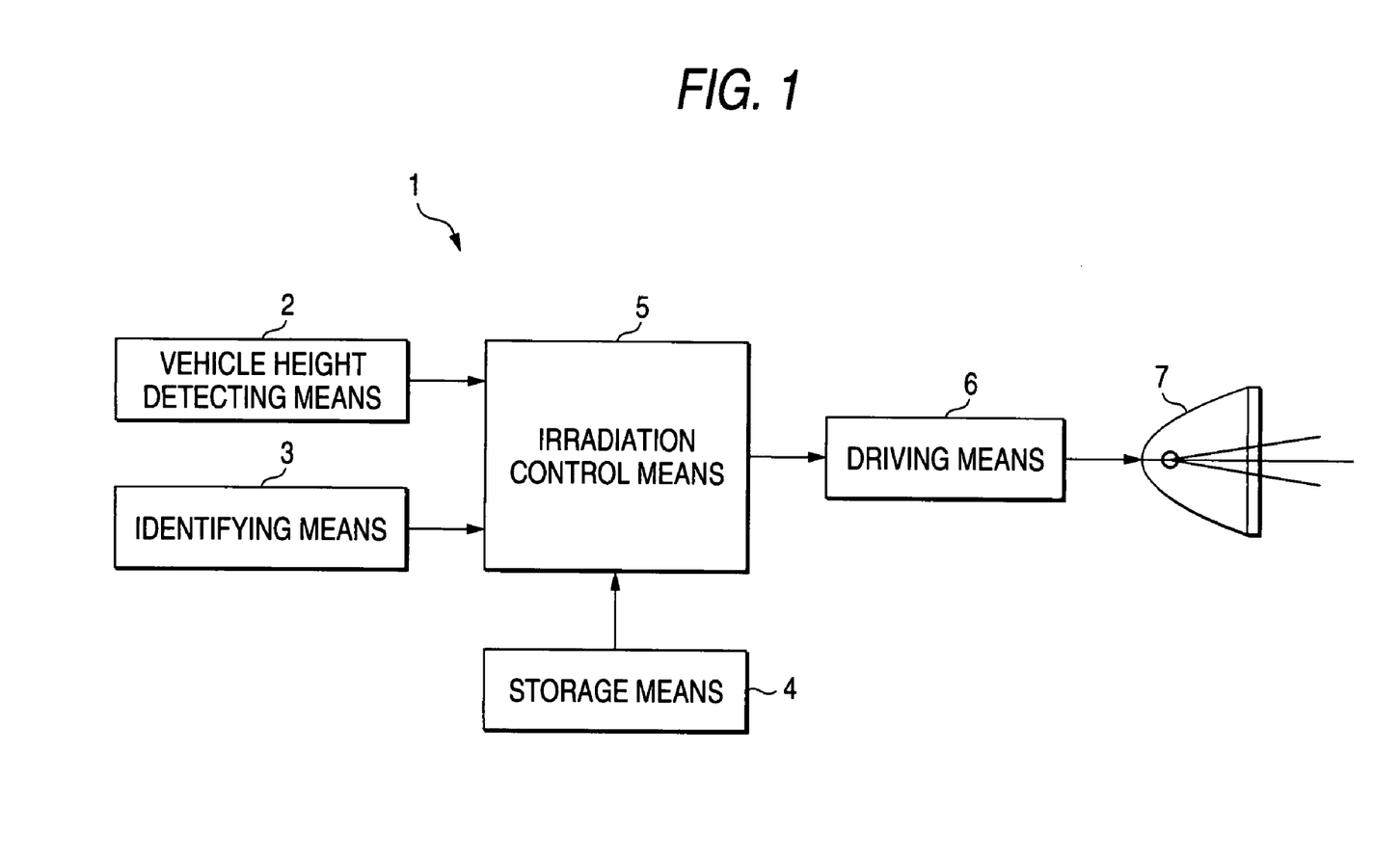
FIG. 1 is a diagram showing an example of the basic structure of an irradiating direction control apparatus according to an exemplary, non-limiting embodiment of the present invention.

FIG. 1 shows the basic structure of an irradiating direction control apparatus according to according to an exemplary, non-limiting embodiment of the present invention.

The irradiating direction control apparatus 1 comprises vehicle height detecting means 2, identifying means 3, storage means 4, irradiation control means 5 and driving means 6. Examples of a lighting unit 7 having an irradiating direction controlled by the irradiation control means 5 through the driving means 6 include a headlamp, a fog lamp and a cornering lamp in case of a lighting unit for an automobile. However, the present invention is not limited thereto.

The vehicle height detecting means 2 detects the displacement of a vehicle height related to the axle portion of the front or rear wheel of a vehicle. A detection signal is then sent to the irradiation control means 5 and is utilized as basic information for obtaining the attitude of the vehicle, whether stopped or running. For example, but not by way of limitation, a configuration is provided in which a vehicle height sensor for detecting a vertical fluctuation is in the axle portion of the front or rear wheel.

Referring to the number of the vehicle height detecting means 2, one vehicle height detecting means 2 is provided in each of the axle portions of the front and rear wheels of the vehicle in the related art configuration (1) (two in total). Only one vehicle height detecting means 2 is provided in the axle portion of the rear wheel in the related art configuration (2), for example (see FIG. 2). However, the present invention is not limited thereto.

The identifying means 3 distinguishes or discriminates (and thus determines) a difference in the load state of a vehicle corresponding to a passenger or a carrying capacity. In an initialization processing for eliminating the influence of the installation error of the vehicle height detecting means 2, a reference vehicle height value corresponding to the load condition of the vehicle is required. In other words, if the initialization processing can be always carried out on the same conditions, it is sufficient that the installation error of the vehicle height detecting means 2 is recorded by using the same reference vehicle height value.

When the amount of gasoline is undefined in the initialization processing on a market as described above, it is a matter of course that the same reference vehicle height value cannot be used. The identifying means 3 sends, to the irradiation control means 5, an identifying signal corresponding to any load condition in which the initialization processing is to be carried out, as will be described below.

The storage means 4 stores data indicative of the installation error of the vehicle height detecting means 2, based on a difference between a reference vehicle height value corresponding to the load state of the vehicle, which is distinguished or discriminated by the identifying means 3 and an actual vehicle height value by using the reference vehicle height value, for which a nonvolatile memory is used.

For example, but not by way of limitation, there is used a flash memory or an EEPROM (Electrically Erasable and Programmable Read Only Memory) in which electrical write and erase can be carried out, and data is held when a power supply is disconnected or an apparatus, in which the backup of an RAM (Random Access Memory) is carried out by a capacitor or a battery so as not to erase the data when the power supply, is disconnected.

The reference vehicle height value represents a vehicle height value (a design value) in a state in which the vehicle height detecting means 2 is attached to a position in accordance with the design (that is, an installation error of zero). The installation error of the vehicle height detecting means is a difference between an actual vehicle height value (a detected value) and a reference vehicle height value in the attitude of a vehicle when initialization processing is carried out. Moreover, the actual vehicle height value or difference data between the actual vehicle height value and the reference vehicle height value in the design of the vehicle may be used as data to be stored in the storage means 4.

As described above, the initialization processing is carried out in a state of "no passenger and 10 L of gasoline" in the assembly line of the manufacturer. Also, the initialization processing is carried out in a state of "no passenger and undefined gasoline" in the market or repair.

For example, but not by way of limitation, an ECU (electronic control unit) including a microcomputer is used as the irradiation control means 5 for an automobile. There can be proposed a first embodiment or configuration, in which a memory provided in the irradiation control means 5 is utilized as the storage means 4, and a second embodiment or configuration, in which an external memory is used as the storage means 4.

In the irradiation control means 5, vehicle height data is corrected using the data stored in the storage means 4 for detected information obtained by the vehicle height detecting means 2. The attitude of the vehicle (pitch angle) is calculated by an operation from the corrected vehicle height data. Also, a control signal for canceling the influence of a change in the attitude of the vehicle is sent to the driving means 6 based on the result of the operation. The pitch angle of the vehicle and a computation for controlling the optical axis of irradiation are calculated in software. For example, but not by way of limitation, a computer-readable medium or data carrier containing a set of instructions for implementing the foregoing computations and/or calculations may be provided.

Referring to the driving means 6, for example (but not by way of limitation), a structure using a stepping motor and a driving circuit thereof can be proposed, and is not limited thereto. For this reason, it is also possible to use a mechanism having an actuator such as a DC motor or a solenoid. Moreover, it is preferable to use a well-known mechanism for a driving mechanism (a leveling mechanism) related to the control of the irradiation of a lighting unit (for example but not by way of limitation, an actuator on the back face of a lamp body and the tilting attitude of a reflecting mirror in a lamp housing may be changed to control the irradiating direction of a lamp). Referring to leveling control in the invention, an application can be carried out regardless of static or dynamic.

Next, a configuration for distinguishing or discriminating the load condition in the initialization processing will be described.

The load condition of the vehicle is changed by various factors, including (but not limited to) the number and arrangement of passengers or the carrying state of a baggage. Referring to the passenger, the presence of seating of the passenger is detected by a seating sensor. Moreover, the weight of a baggage (such as a trunk) is detected by means of a sensor or information (such as the residual amount of gasoline) is acquired.

For purposes of simplicity of explanation, description will be given to initialization processing in an assembly line and a structure for easily distinguishing or discriminating an initialization processing in the market. However, it is noted that additional variables and conditions related to weight distribution and positioning and/or pitch of an automobile may be similarly calculated.

For example, but not by way of limitation, the following configurations or embodiments can be proposed.

(I) A configuration in which manipulations or operations in the initialization processing on the assembly line and the market having a difference are distinguished from one another by utilizing a manipulating signal, or a signal indicative of an operation state; and (II) A configuration in which information about the residual amount of gasoline is acquired to discriminate a difference in load conditions.

In the configuration (I), a reference vehicle height value is changed when a signal obtained by the manipulation in the initialization processing on the assembly line or a signal indicative of the state of a power source (an engine or a motor) is detected, and when the same signal is not detected. For example, but not by way of limitation, it is preferable that the following signals should be utilized. However, the present invention is not limited to the foregoing signals, and other signals may also be used.

A parking brake (PBK) signal, and

A signal indicative of the stop or driving state of an engine.

Figure 3:
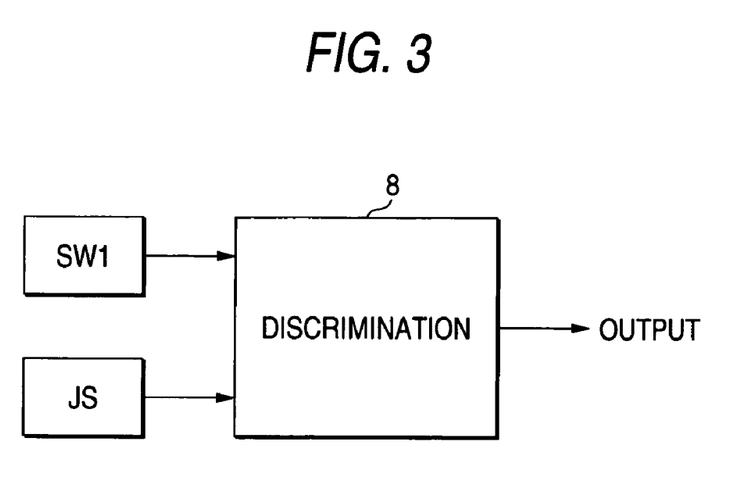
FIG. 3 is an explanatory diagram showing an example of a discrimination processing according to an exemplary, non-limiting embodiment of the present invention.

FIG. 3 illustrated an example of discrimination processing. A signal "JS" indicates any of the signals described above.

An initializing switch "SW1" gives a command for an initialization processing to the apparatus. The command is sent to a discriminating section 8 (an AND circuit). The actual switch SW1 is not necessarily an operating switch, but represents a state is set depending on the "short" or "open" state of a detecting terminal. As a result, a structural switch is not required for implementation of the present invention, but only a representation of the relevant state.

In the initialization processing on the assembly line, the parking brake is not engaged. In the initialization processing on the market, accordingly, it is preferable to define that the parking brake is always applied.

When the command signal of the SW1 and the PBK signal JS are input to the discriminating section 8 and when only the command signal of the SW1 is input to the discriminating section 8, it is possible to distinguish a difference between both situations, change a reference vehicle height value depending on respective load conditions, and record the installation error of a vehicle height sensor by setting the reference vehicle height value as a reference value.

When a signal JS indicative of the stop or driving of an engine (a binary signal of Hi (High) or Lo (Low) obtained from an L terminal) is utilized, the engine is turned OFF (stopped) in the initialization processing on the assembly line, and the engine is turned ON (an operation state) in the initialization processing on the market. When the command signal of the SW1 and a signal JS indicative of the stop of the engine are input to the discriminating section 8 and when the signal of the SW1 and a signal JS indicative of an engine-ON state are input to the discriminating section 8, it is possible to distinguish a difference in both initialization processings.

While the configuration in which an existing signal in a vehicle is utilized has been described in the example, it is not restricted thereto. Additionally, the following configurations can be proposed.

A configuration in which a plurality of initializing switches is to be provided;

A configuration in which a distinction is made depending on a difference in a set voltage; and A configuration in which a distinction is made depending on the number of inputs of the initializing switch.

Figure 4:
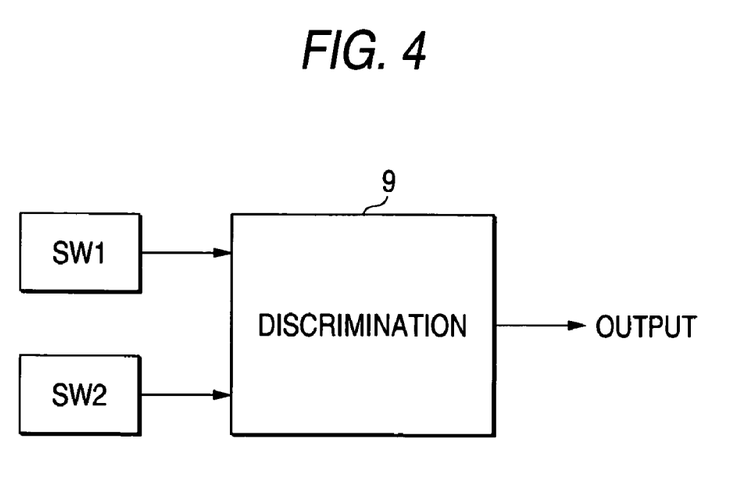
FIG. 4 is an explanatory diagram showing discrimination processing carried out when a plurality of initializing switches is provided according to an exemplary, non-limiting embodiment of the present invention.

FIG. 4 shows an example in which two kinds of initializing switches "SW1" and "SW2" are provided.

For example, but not by way of limitation, only the switch SW1 is in the ON state during initialization processing on the assembly line, and both of the switch SW1 and the switch SW2 are in the ON state during initialization processing on the market. Signals are sent from the switch SW1 and the switch SW2 to a discriminating section 9, so that a difference in initializing can be distinguished.

In such a configuration that a plurality of initializing switches is provided corresponding to a load state in the initialization processing to distinguish a difference in the load state, the structure is simplified and the switching state is prevented from being recognized by mistake (the mistake of an operator is more like to be made in a method in which only one of the SW1 and the SW2 is turned ON).

Figure 5:
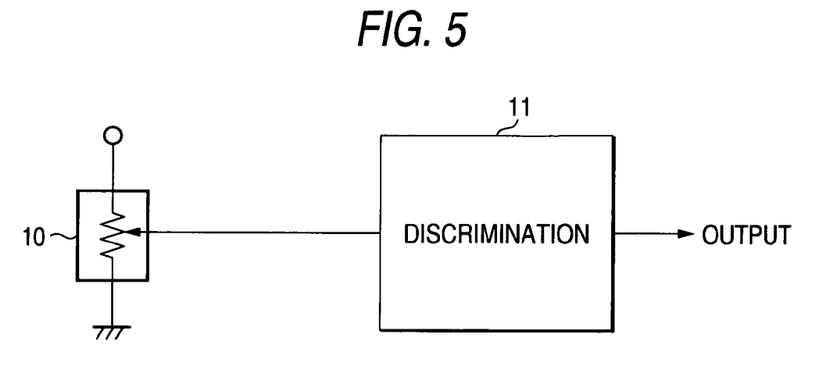
FIG. 5 is an explanatory diagram showing discrimination processing corresponding to a set voltage according to an exemplary, non-limiting embodiment of the present invention.

In place of the ON/OFF state of the initializing switch, it is also possible to detect a set voltage or current to distinguish a difference in the load state in the initialization processing. As shown in FIG. 5, for example (but not by way of limitation), it is preferable to detect an input voltage from a voltage setting section 10 using a variable resistor, to a discriminating section 11.

The level of an analog voltage is detected and the discriminating section 11 decides whether the set voltage is equal to or lower than a threshold (for example but not by way of limitation, 2.5 V).

For example but not by way of limitation, it is preferable that the set voltage should be equal to or lower than the threshold in the initialization processing on the assembly line, and the set voltage should be higher than the threshold in initialization processing on the market.

Figure 6:
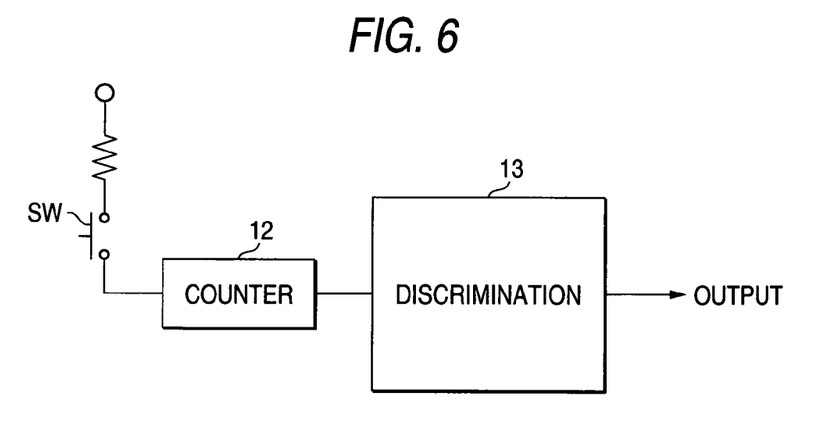
FIG. 6 is an explanatory diagram showing discrimination processing corresponding to the number of inputs according to an exemplary, non-limiting embodiment of the present invention.

FIG. 6 shows an example in which the number of inputs of the initializing switch is detected to distinguish a difference in the load state in initialization processing.

The number of operations of the switch SW is counted by a counting section (a counter) 12, and a result thereof is sent to a discriminating section 13.

For example, but not by way of limitation, it may be determined that the switch SW is turned ON/OFF twice in a predetermined time during initialization processing on the assembly line, and the SW is turned ON/OFF three times in a predetermined time in initialization processing on the market. Consequently, it is possible to distinguish the respective initialization depending on a difference in the number of inputs in a predetermined time. In this embodiment, one initializing switch SW is enough, and the erroneous detection of the number of inputs can be prevented.

In configuration (I), it is possible to identify the difference in the load state by utilizing a signal such as PBK or a switch to be used in the initialization processing, and it is impossible to obtain the details of the amount of gasoline in the initialization processing on the market.

In configuration (II), information about the residual amount of a fuel is acquired, and the difference in the load state in the initialization processing is distinguished.

Figure 7:
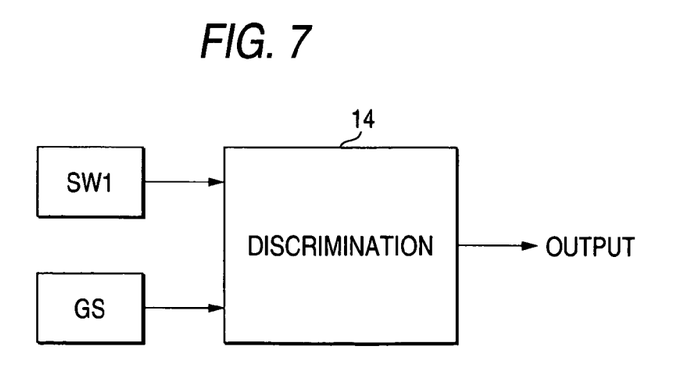
FIG. 7 is an explanatory diagram showing discrimination processing utilizing information about the residual amount of a fuel according to an exemplary, non-limiting embodiment of the present invention.

For example, but not by way of limitation, in FIG. 7, the command signal of the initializing switch SW1 and a signal "GS" indicative of the residual amount of the fuel are sent to a discriminating section 14, and it is possible to obtain the residual amount in detail when the command of the switch SW1 is given.

Data on the residual amount of the fuel can be acquired from the fuel monitoring device of a vehicle. Therefore, it is preferable that the residual amount of the fuel in the input of the switch SW1 be checked to calculate a reference vehicle height value corresponding to the residual amount, and to record difference data between the reference vehicle height value and a vehicle height value (an actual measured value). Consequently, an amount of gasoline of 10 L is detected in the initialization processing on the assembly line, and an amount of the gasoline at that time becomes clear in the initialization processing on the market.

Data on the reference vehicle height value corresponding to the amount of the fuel is apparently obtained when an amount of fuel is actually changed, to calculate vehicle height value data obtained when the attitude of the vehicle is changed. However, it is also possible to calculate the same data by a calculating method related to the static attitude of the vehicle. In the development of an auto-leveling apparatus, a change in the attitude of the vehicle on the load condition is calculated based on the design data of the vehicle.

"$M=\Sigma Fi$" ("$\Sigma$" represents a sum of i) is formed by a load distribution, wherein a load applied to a vehicle is represented by "M", the position coordinates of a load point are represented by (X, Y) (the direction of advance of the vehicle is set to be a Y-axis direction, and the transverse direction of the vehicle is set to be an X-axis direction), and a load applied to each of front and rear wheels in left and right parts is represented by "Fi" (i=1 to 4).

By using position data (xi, yi) on the front and rear wheels in the left and right parts, moreover, two relational expressions are obtained based on a balance of a moment of force. In other words, the sum of components of the moment for X and Y axes, that is, both $\Sigma(X-xi) \cdot Fi$ and $\Sigma(Y-yi) \cdot Fi$ are zero.

When a difference between changes in left and right vehicle heights related to a front wheel is represented as "L1−L2" and a difference between changes in left and right vehicle heights related to a rear wheel is represented as "L3−L4", it is assumed that both of them are equal to each other (L1−L2=L3−L4). This is set based on the fact that the support portion of each wheel is placed on a single plane, and the difference between the left and right vehicle heights of the front wheel portion is equal to the difference between the left and right vehicle heights of the rear wheel portion (that is, a surface connecting four points is not twisted in relation to the change in the vehicle height of each wheel portion from a reference position).

Furthermore, "$Fi=Kf \cdot Li$" (i=1, 2) and "$Fi=Kr \cdot Li$" (i=3, 4) are obtained, wherein the spring constants of the front and rear wheel portions corresponding to the modulus of elasticity of a suspension are represented by "Kf" and "Kr", respectively.

Position data "(xi, yi)" (i=1 to 4) of each wheel are apparent from the tread widths of the front and rear wheels and a wheelbase.

Accordingly, the above equations are caused to be simultaneous, so that Li (i=1 to 4) can be solved.

For example, but not byway of limitation, if the position information about a fuel tank is given on the assumption that the load M is based on the weight of fuel, a change in a vehicle height at that time can be accurately calculated. Since the result of the calculation corresponding to the residual amount of the fuel can be obtained, a reference vehicle height value can be determined based thereon.

It is preferable that each load should be calculated to obtain the sum of the result.

A control error generated by a difference between load conditions in an initialization processing is described below.

In configuration (2), there is a structure in which a vehicle height sensor is provided in the axle portion of a rear wheel. Auxiliary detecting means 15 is used to estimate vehicle height information of the front wheel portion by a predetermined control equation (see FIG. 2).

Figure 2:
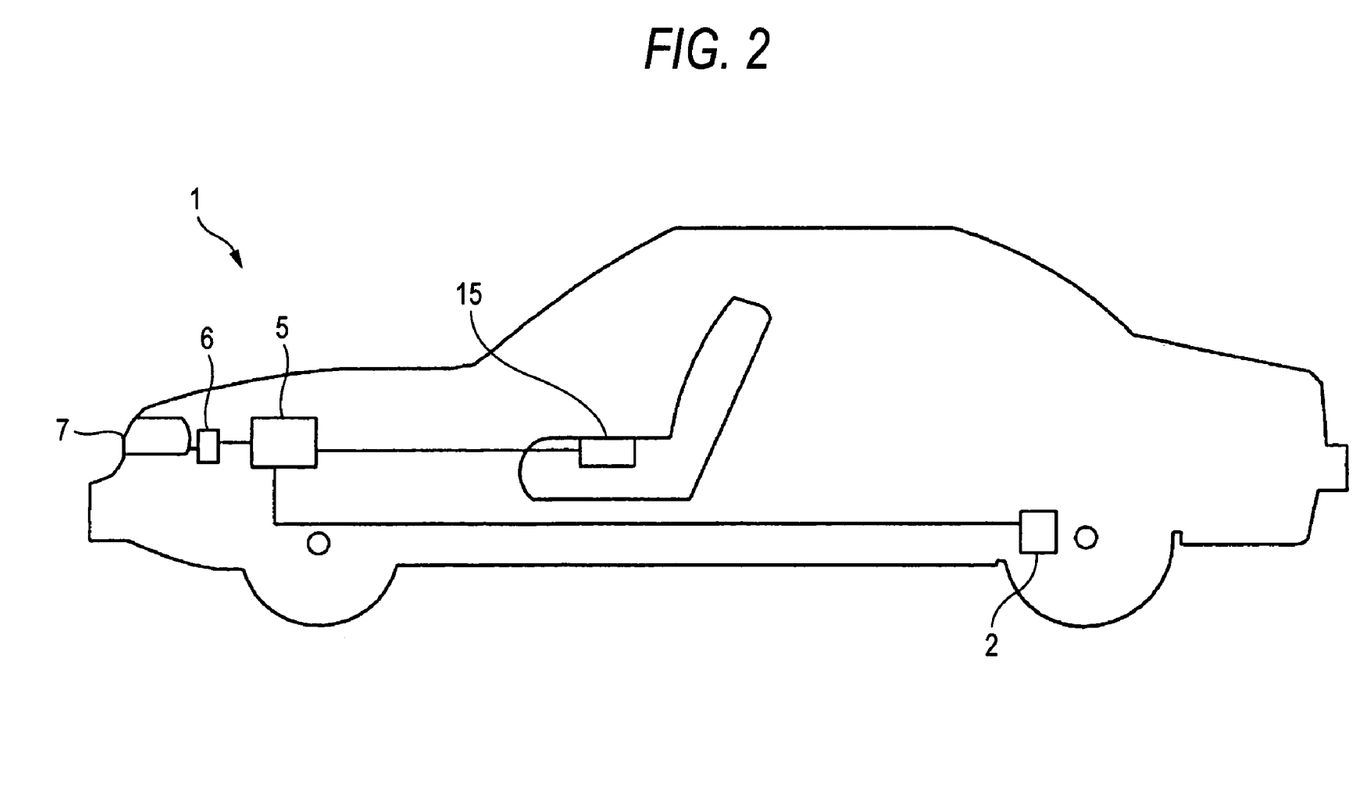
FIG. 2 is a schematic explanatory view showing an example of a structure in which vehicle height detecting means is provided in the rear wheel portion of a vehicle according to an exemplary, non-limiting embodiment of the present invention.

The auxiliary detecting means 15 is required for accurately controlling the direction of the optical axis of irradiation for a change in the load of the vehicle. Also, a sensor (a seating sensor) detects the seating state of a passenger or a sensor provided in the buckle of a seat belt, and detects the presence of an attachment.

When detected data (displacement amount) of the vehicle height sensor of the rear wheel portion is represented by "dHr" and a vehicle pitch angle is represented by "P", the following two equations are used when a control equation is a linear function.

(a) When only a driver gets in a car, $$P = \alpha \cdot dHr.$$

(b) When a driver and a passenger get in a car, $$P = \beta \cdot dHr + \gamma.$$

When both of $\alpha$ and $\beta$ are negative, "$|\alpha| > |\beta|$" is set, which indicates that a variation in a pitch angle with respect to a change in a vehicle height is smaller when two people take front seats. Moreover, an intercept "$\gamma$" indicates a value on a P axis which remains as a result of the execution of initial aiming such that a control line in equation (a) passes through an origin (this depends on the fact that the control line is translated in the direction of the P axis as will be described below).

Figure 8:
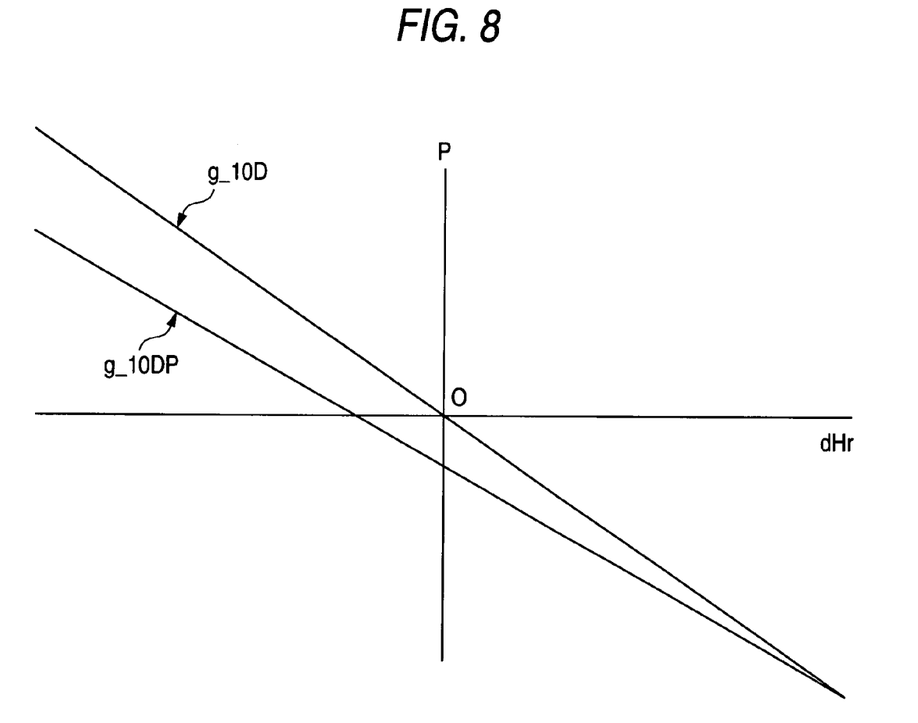
FIG. 8 is a graph illustrating a control line obtained after initial aiming regulation in the case in which a passenger is not present and the amount of gasoline is 10 L on an assembly line, according to an exemplary, non-limiting embodiment of the present invention.

FIG. 8 illustrates a control line obtained after initial aiming regulation when a passenger is not present and an amount of gasoline is 10 L on an assembly line. An axis of abscissa indicates dHr and an axis of ordinate indicates P.

A control line "g_10D" is used when only a driver gets in a car, and a control line "g_10DP" is used when a driver and a passenger in a passenger seat get in a car.

Figure 9:
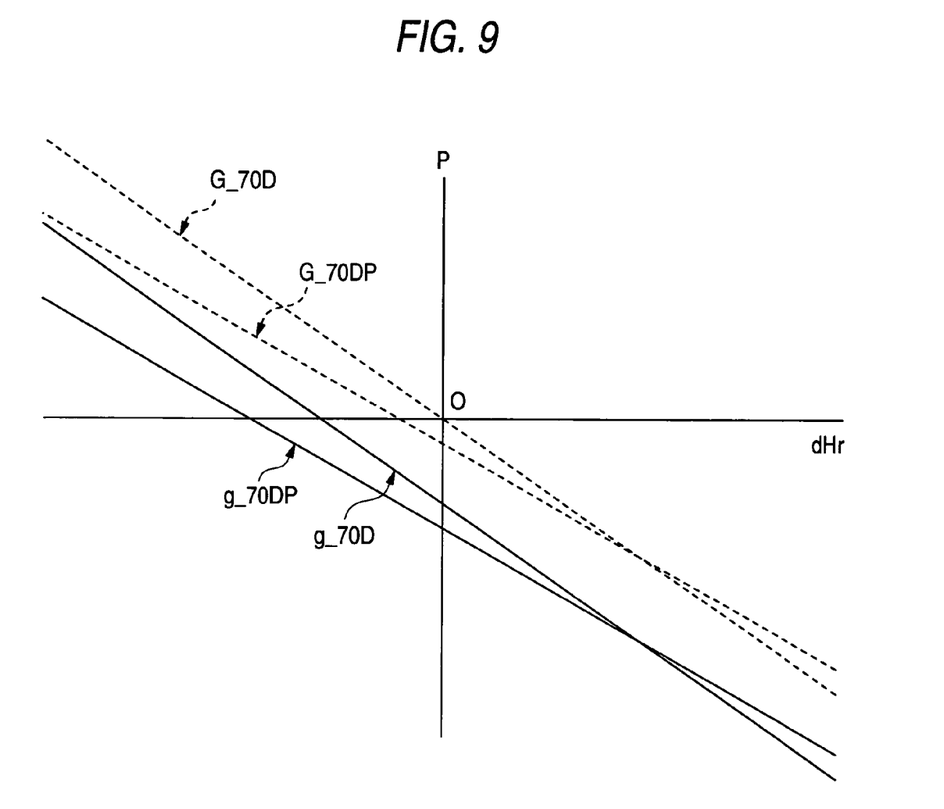
FIG. 9 is a graph illustrating a control line obtained in the case in which a passenger is not present and the amount of gasoline is a maximum on a market according to an exemplary, non-limiting embodiment of the present invention.

FIG. 9 illustrates a control line when a passenger is not present and a maximum amount of gasoline is carried (70 L) in the market, and an axis of abscissa indicates dHr. An axis of ordinate indicates P.

The control lines "g_70D" and "g_70DP" shown in solid lines indicate control lines obtained before the initial aiming regulation. The control line "g_70D" indicates the case in which only a driver gets in a car, and the control line "g_70DP" indicates the case in which a driver and a passenger in a passenger seat get in a car.

By the initial aiming regulation, g_70D and g_70DP are translated in the direction of the P axis. As a result, the control line g_70D passes through an origin like a control line G_70D, shown as a broken line. Moreover, the control line g_70DP is moved to a control line G_70DP, shown as a broken line (the amount of movement in the direction of the P axis is equal to the amount of movement from the control line g_70D to the control line G_70D).

Figure 10:
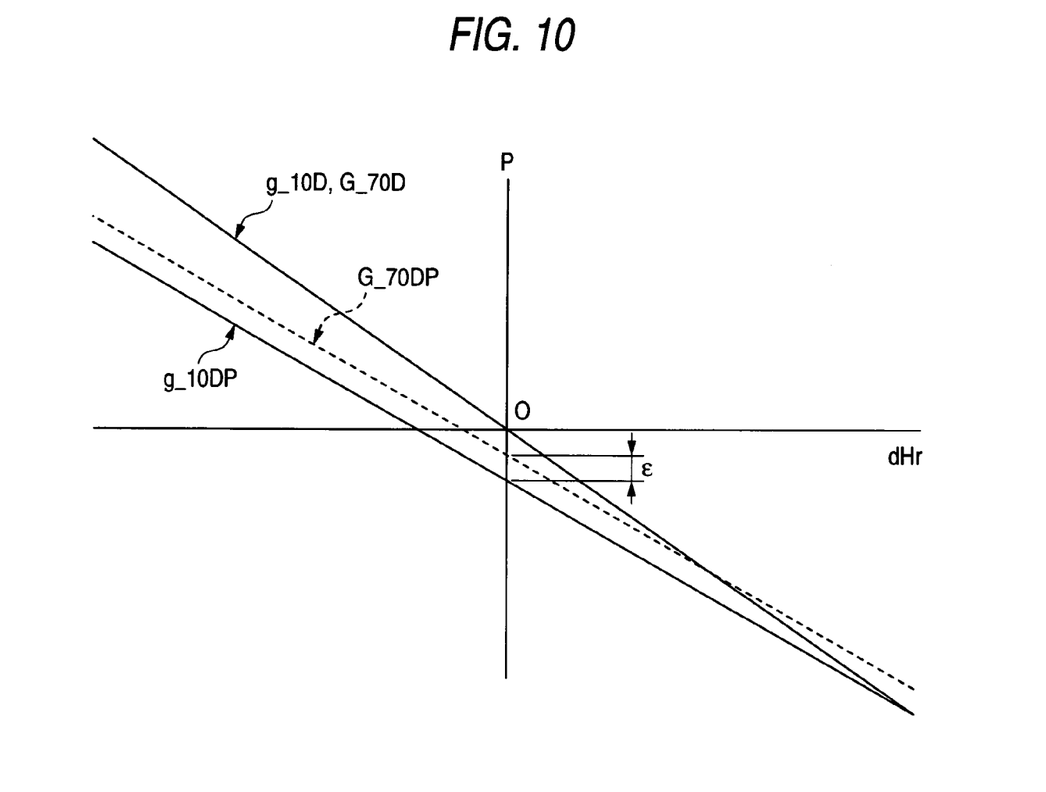
FIG. 10 is a graph for explaining a control error made by a difference between conditions in initialization processing according to an exemplary, non-limiting embodiment of the present invention.

FIG. 10 shows the control lines g_10D, g_10DP, G_70D and G_70DP together.

The control lines g_10D and G_70D are coincident with each other, because the initial aiming regulating work is carried out in a state in which leveling control is performed by a control equation (transformation), when a person does not take a passenger seat on both the assembly line and the market. More specifically, the difference in the amount of gasoline is not made in the inclination of the control equation but is made as a difference in the intercept of the P axis. Therefore, every control line becomes a straight line passing through an origin and having a gradient ($\alpha$) after the aiming regulation.

On the other hand, in a state in which a person takes the passenger seat, the control line has a gradient $\beta$ which is different from $\alpha$. Consequently, a control error (this is represented by "$\epsilon$" and indicated as a difference on the P axis between g_10DP and G_70DP in FIG. 10) is made corresponding to a multiplication of a difference ($\alpha - \beta$) and an installation error of a vehicle height sensor (which is made as a shift on the axis of abscissa dHr).

For example, but not byway of limitation, if a difference in a vehicle height detection value is set to be approximately 10 mm between a state of an amount of gasoline of 10 L on the assembly line and a state of a maximum amount of gasoline of 70 L on the market, and $|\alpha - \beta| \approx 0.01$ is set, then a control error of approximately 0.1 degree is made when a person takes the passenger seat. This value indicates the worst error in which a difference in the amount of gasoline between the assembly line and the market is 60 L when only one initializing switch is provided.

To reduce the foregoing error, whether the residual amount of gasoline is equal to or larger than a half of a maximum amount (a full amount) is determined. For example, but not by way of limitation, data on a residual amount is found when the initializing switch is turned ON in the configuration (II), while it is preferable that an operator should visually decide the residual amount in the configuration (I). When the residual amount of gasoline is equal to or larger than a maximum amount, a signal indicative of the initialization processing on the market is input to the apparatus.

On the assumption that the amount of gasoline is not defined in the initialization processing on the market (for example but not by way of limitation, when a maximum amount is 70 L and a distinction is separately made in two stages based on 70/2= 35 L), a variation is made in the amount of gasoline within a range of 35 to 70 L. For example, but not by way of limitation, if the reference vehicle height value for the initialization processing on the market is set in a state of 70 L×(¾)=52.5 L, an error corresponding to the worst of 17.5 L is made when the amount of gasoline is equal to or larger than a half.

When the residual amount of gasoline is equal to or smaller than a half of the maximum amount, the worst state is brought when the amount of gasoline is 35 L. More specifically, in this case, the amount of gasoline of 10 L is set as a reference, and a vehicle height difference corresponding to a difference of 35 L−10 L=25 L is made. As an example of a computation, the worst error of 0.05 degree is obtained when a difference in a vehicle height detection value is 4.6 mm (which is 50% for approximately 0.1 degree described above).

As compared with a control error corresponding to a difference in the amount of gasoline (60 L in the above example) which is made when any countermeasure is not taken, the difference is apparent. It has been confirmed that the control error becomes a half or less (that is, precision can be enhanced by a double or more) if the different reference values are properly set for the assembly line and the market, respectively, as described above.

Also, when the amount of gasoline is not particularly specified in the initialization processing on the market, it is possible to reduce the control error by taking the countermeasure according to the invention. For example, but not byway of limitation, as in the configuration (I), the reference value of the amount of gasoline may be set to reduce the worst error related to the amount of gasoline, even if the residual amount of gasoline is not accurately known and the reference vehicle height value should be used in that state.

In the example, in a first load state to be the load state of a vehicle distinguished by the identifying means 3, the amount of a fuel is assumed to be a specified amount (10 L) which is smaller than a half of the full amount (70 L) and a reference vehicle height value is used with that load in the initialization processing on the assembly line. In a second load state related to a vehicle, another reference vehicle height value is used when the amount of the fuel is a specified amount that is equal to or larger than a half of the full amount (for example, but not by way of limitation, three quarters of the full amount) in the initialization processing on the market. In addition, it is a matter of course that a control error can be further reduced by dividing the amount of the fuel into three stages or more, and specifying a reference amount of the fuel in each stage to set a vehicle height reference value in more detail.

The present invention has various advantages over the related art, and other advantages as well. As is apparent from the description, according to the first aspect of the invention, it is possible to reduce a control error made by a difference in a condition in an initialization processing by changing a reference vehicle height value depending on the load state of a vehicle. Therefore, it is possible to fully suppress the influence of the installation error of the vehicle height detecting means on the control of an irradiating direction.

According to the second aspect of the invention, it is possible to easily identify the initialization processing on the assembly line of a vehicle.

According to the third and fourth aspects of the invention, it is possible to distinguish various load states, thereby carrying out the initialization processing.

According to the fifth aspect of the invention, it is sufficient that only one initializing switch is provided, and a structure is simplified.

According to the sixth aspect of the invention, it is possible to accurately obtain the load state from information about the residual amount of a fuel.

According to the seventh aspect of the invention, it is possible to fully reduce a control error made by a variation in the amount of the fuel in the initialization processing even if the residual amount of the fuel cannot be grasped accurately.

The present invention is not limited to the specific above-described embodiments. It is contemplated that numerous modifications may be made to the present invention without departing from the spirit and scope of the invention as defined in the following claims.

We claim:

1. An irradiating direction control apparatus of a lighting unit for a vehicle, said apparatus changing an irradiating direction of the lighting unit depending on an attitude of the vehicle that is based on information detected by vehicle height detecting means, said apparatus comprising:

identifying means for determining a change in a load state of the vehicle corresponding to at least one of a passenger or a carrying capacity;

storage means for storing data indicative of an installation error of the vehicle height detecting means, based on a difference between a reference vehicle height value corresponding to a load state of the vehicle determined by the identifying means and an actual vehicle height value, by using the reference vehicle height value in performing an initialization for eliminating an influence of the installation error on control performed by said control apparatus; and irradiation control means for obtaining the attitude of the vehicle based on an operation from vehicle height data corrected by using the data stored in the storage means for the data detected by the vehicle height detecting means and for controlling a direction of an optical axis of irradiation of the lighting unit for the vehicle, based on a result of the operation, wherein the reference vehicle height value changes when at least one of an operating signal in an initialization on an assembly line of the vehicle or a signal indicative of a state of a power source is detected, and said vehicle height changes when the signal is not detected.

2. The apparatus of claim 1, wherein a plurality of initializing switches distinguish a difference in a load state in the initialization.

3. The apparatus of claim 1, wherein at least one of a voltage or a current set by an initializing switch is detected to distinguish a difference in a load state in the initialization.

4. The apparatus of claim 1, wherein at least one input of an initializing switch is detected to distinguish a difference in a load state in the initialization.

5. The apparatus of claim 1, wherein information representing a residual amount of a fuel is acquired to distinguish a difference in a load state in the initialization.

6. The apparatus of claim 1, wherein said lighting unit comprises at least one of a headlamp, a fog lamp and a cornering lamp.

7. The apparatus of claim 1, wherein said vehicle height detecting means detects a displacement of a vehicle height related to an axle portion of at least one of a front wheel and a rear wheel of said vehicle.

8. The apparatus of claim 1, wherein said storage means comprises at least one of a flash memory an EEPROM, and can be backed up to prevent erasure when power is not supplied to said storage means.

9. The apparatus of claim 1, wherein said identifying means comprises a computer-readable medium containing a set of instructions for performing said determining of said difference, and said irradiation control means comprises a computer-readable medium containing a set of instructions for performing said obtaining and said controlling.

10. An irradiating direction control apparatus of a lighting unit for a vehicle, said apparatus changing an irradiating direction of the lighting unit depending on an attitude of the vehicle that is based on information detected by vehicle height detecting means, said apparatus comprising:

identifying means for determining a change in a load state of the vehicle corresponding to at least one of a passenger or a carrying capacity;

storage means for storing data indicative of an installation error of the vehicle height detecting means, based on a difference between a reference vehicle height value corresponding to a load state of the vehicle determined by the identifying means and an actual vehicle height value, by using the reference vehicle height value in performing an initialization for eliminating an influence of the installation error on control performed by said control apparatus; and irradiation control means for obtaining the attitude of the vehicle based on an operation from vehicle height data corrected by using the data stored in the storage means for the data detected by the vehicle height detecting means and for controlling a direction of an optical axis of irradiation of the lighting unit for the vehicle, based on a result of the operation, wherein a reference vehicle height value obtained when an amount of a fuel is a specified amount smaller than a fraction of a full amount of a fuel container is used in a first load state related to the vehicle, and a reference vehicle height value obtained when the amount of the fuel is a specified amount equal to or larger than the half of the full amount is used in a second load state related to the vehicle.

11. The apparatus of claim 10, wherein said fraction is one-half.

* * * * *